(12) United States Patent
Chen et al.

(10) Patent No.: US 7,114,759 B1
(45) Date of Patent: Oct. 3, 2006

(54) VEHICLE WINDSHIELD SUNSHADE

(75) Inventors: Taiming Chen, 150 Forest Hill Dr., Los Gatos, CA (US) 95032; Tzu-Hsin Yang, Los Gatos, CA (US)

(73) Assignee: Taiming Chen, Los Gatos, CA (US)

( * ) Notice: Subject to any disclaimer, the term of this patent is extended or adjusted under 35 U.S.C. 154(b) by 0 days.

(21) Appl. No.: 11/247,573

(22) Filed: Oct. 11, 2005

Related U.S. Application Data

(60) Provisional application No. 60/691,976, filed on Jun. 18, 2005.

(51) Int. Cl.
*B60J 3/00* (2006.01)

(52) U.S. Cl. .................. 296/97.2; 296/97.7; 296/97.8; 296/97.9

(58) Field of Classification Search .............. 296/97.1, 296/97.2, 97.7, 97.8, 97.9; 160/370.23, DIG. 2
See application file for complete search history.

(56) References Cited

U.S. PATENT DOCUMENTS

| | | | | |
|---|---|---|---|---|
| 3,003,812 A | * | 10/1961 | Haugland | 296/97.7 |
| 5,044,686 A | * | 9/1991 | Acenbrack | 296/97.7 |
| 5,100,194 A | * | 3/1992 | Decker | 296/97.7 |
| 5,653,277 A | * | 8/1997 | Kerner et al. | 296/97.8 |
| 5,860,466 A | * | 1/1999 | Kao | 160/370.22 |
| 6,648,396 B1 | * | 11/2003 | Monahan et al. | 296/97.7 |
| 2005/0189784 A1 | * | 9/2005 | Guerreiro et al. | 296/152 |

* cited by examiner

*Primary Examiner*—Jason Morrow

(57) ABSTRACT

An automotive vehicle windshield sunshade includes a shade that can be folded horizontally in an overlapping manner for resting on a top of a vehicle dashboard when it is not used. At least two attaching points attach a bottom edge of the shade to the dashboard. A hook with a handle attaches to a top fold of the sunshade and may hook over the supporting beam of rearview mirror and hang the sunshade opened.

12 Claims, 3 Drawing Sheets

VEHICLE WINDSHIELD SUNSHADE

CROSS-REFERENCE TO RELATED APPLICATIONS

This application is related to and claims priority from U.S. Provisional Patent Application Ser. No. 60/691,976 filed on Jun. 18, 2005.

FIELD OF THE INVENTION

The present invention relates, in general, to a vehicle windshield sunshade that can be used for shading an interior of a vehicle from the heat of sunlight and a mounting method thereof in a vehicle.

BACKGROUND OF THE INVENTION

Vehicles, particularly cars are commonly parked unattendedly at some placed exposed to sunlight. Sunlight can go through transparent windows and heat up interior of a vehicle. Among all windows, a windshield allows least tinting or darken for reducing sunlight penetration; yet a dashboard directly beneath a windshield is designed to absorb sunlight to a maximum level so it do not cause gaze reflection to incident into driver's sight. That also means generating most heat when sunlight shines upon it.

The foldable sunshades of the present invention may be extended behind the windshield of a parked automobile to act as a barrier to sunlight, reducing heat buildup within the vehicle interior from exposure to sunlight.

In general, vehicle sunshades may be positioned to shield a vehicle interior from either an interior or exterior location. As an example, interior sun shades include folding cardboard sun shades for placement behind vehicle windshields such as those illustrated in the patent to Levy, U.S. Pat. No. 4,202,396. Other types of interior windshield sun shades include fan-like venetian blind arrangements, and designs consisting of fabric supported by elongated loops of spring-like material. The patent to Soukup, U.S. Pat. No. 1,927,137, shows an adjustable glare shield, for use within a motor vehicle. The patent to Lessard, U.S. Pat. No. 3,373,792, discloses an automobile rain visor. The patent to Surtin, U.S. Pat. No. 4,332,414, shows an automobile window shade device, comprising a pair of duplicate fan-shaped protectors for mounting to an automobile window. The patent to Maguire, U.S. Pat. No. 4,606,572, shows a similar type of dual fan arrangement for providing a sunshade for an automobile. The patent to Tung-Chow, U.S. Pat. No. 4,681,149, discloses window blinds for a vehicle, incorporating suction cups for adherence to a supporting surface adjacent the automobile window. The patent to Cheny, U.S. Pat. No. 3,046,048, discloses what is a magnetically secured windshield cover, which overlies and remains contiguous with the exterior of the automobile windshield.

BRIEF SUMMARY OF THE INVENTION

The purpose of the invention is to provide a windshield sunshade device rested on a top of a dashboard. The windshield has a flat surface under the windshield of a vehicle, when not using; can be pulled up from dashboard to extend till hook over the supporting beam of a rearview mirror for hanging open and blocking sunlight from incident into vehicle.

The main feature of the present invention is a shade comprise of a plurality of planar rectangular elements that are joined to each other along horizontal edges thereof, the sunshade having a compressed position for resting on a top of a dashboard and a stretched position at the inside of the windshield wherein the planar rectangular elements extend away from the top of the dashboard and along windshield pillars of a vehicle to a top of a windshield.

Further, at least two attaching points on the bottom edge of this sunshade at spaced-apart locations are attached to the top of the dashboard next to a bottom end of the windshield so as to keep the sunshade in place.

Further, a hook having a handle is attached to a center of a top fold of the sunshade. The handle serves for a user to grip on and to pull the sunshade upward and the hook serves for hooking over a supporting beam of a rearview mirror to hang the sunshade opened.

Further, sunlight absorbing material is used to make the top fold of the sunshade which provides a top cover that covers the rest of the sunshade as in a compressed position so as to avoid gaze reflection to be incident into driver's sight.

DETAILED DESCRIPTION OF THE PREFERED EMBODIMENT

Figure 1:
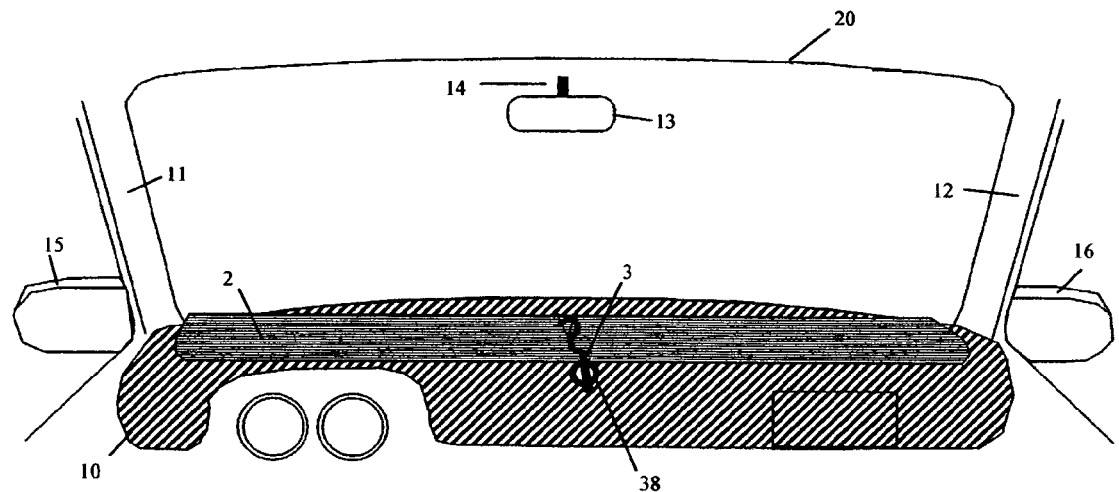
FIG. 1 is a rear perspective view of the invention in a compressed position on a top of the dashboard of a vehicle.

Prior to proceeding to the more detailed description of the present invention, it should be noted that, for the sake of clarity and understanding, identical components which have identical functions have been identified with identical reference numerals throughout the several views illustrated in the drawing figures.

Figure 2:
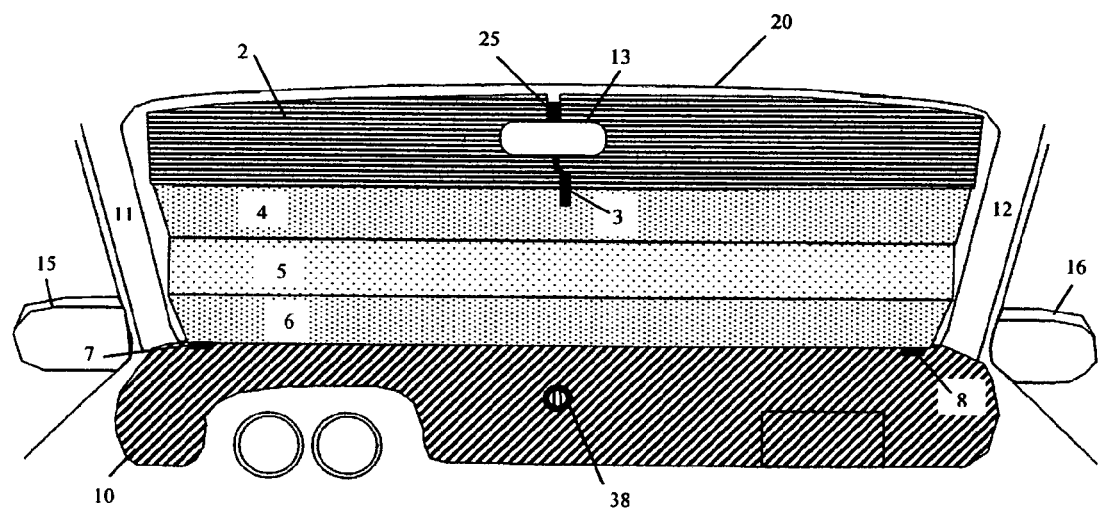
FIG. 2 is a rear perspective view of the invention in a stretched position on a top of the dashboard of a vehicle and hanged from a rearview mirror.
Figure 3:
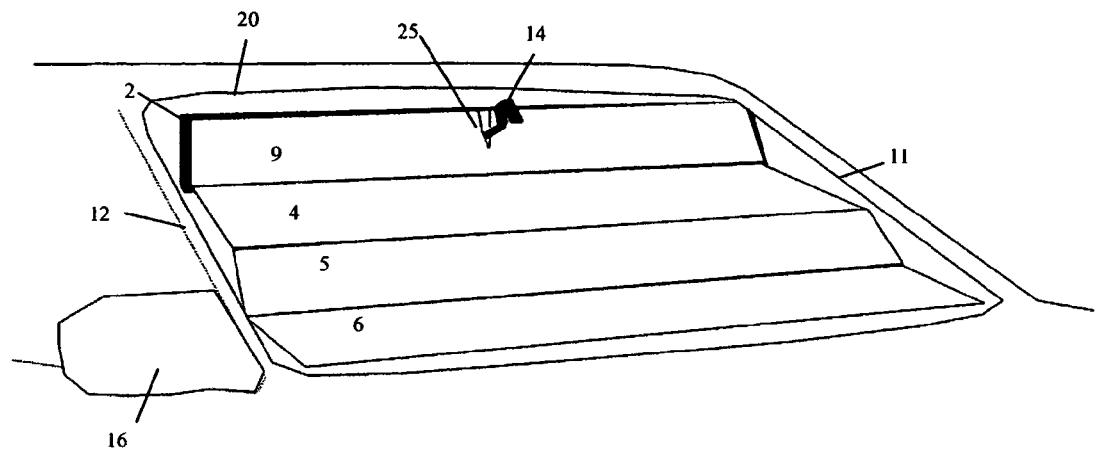
FIG. 3 is a front perspective view from a front of a vehicle windshield, particularly showing the sunshade in the stretched position

The sunshade as show in FIGS. 1, 2 and 3 is placed behind a vehicle windshield 20 and on a top of a dashboard 10. When the sunshade folded along its horizontal joints in an overlapping manner, only a top cover 2 and a hook-handle 3 thereof can be seen as in FIG. 1. FIG. 3 shows the top fold of the shade which consists of two different sides, and the top cover 2 is made of sunlight absorbing material and has a color for reducing gaze reflection incident into a driver's sight. The other side 9 facing outward as extended, together with other folds 4, 5, and 6 of the shade should be made of sunlight reflecting material and color. FIG. 1 also shows a handle 3 which is accepted by a fixed base 38 on a top of the dashboard for restricting unwanted free movement due to the motion of a vehicle.

FIG. 2 shows that there are two attaching points 7, 8 on the lower edge of the sunshade. They are made of flexible material and are attached to a top of a dashboard by means of a screw or a double face sticking tape to keep the lower edge of the shade stay on the surface of the dashboard. When extending, user pulls the handle 3 and subsequently pulls all sunshade planar rectangular elements 2, 4, 5, 6 upward along windshield pillars 11, 12 till the handle is near to a top edge of windshield 20 where a rearview mirror 13 is located and commonly supported by a beam 14. User may use the hook-handle 3 to hook over the rearview mirror supporting beam 14 and hang the sunshade open. The two attaching points 7, 8 keep the lower edge of the shade stay on the surface of dashboard despite the up pulling action. The sunshade then sustains open along and behind the windshield surface for sunlight blocking.

A V-shape cut 25 on the top fold of sunshade allows shade to go around the rearview mirror supporting beam 14 when being hooked over. This allows the sunshade to block higher portion of the windshield than where the rearview mirror supporting beam is.

Figure 4:
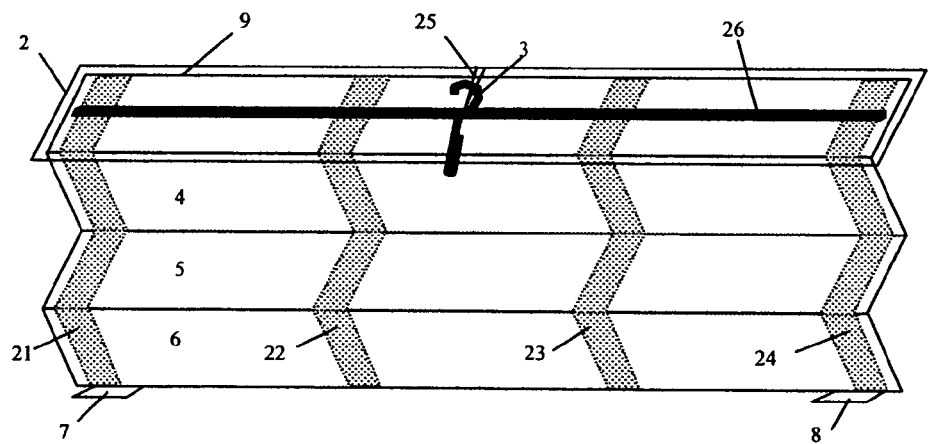
FIG. 4 is an elevational view of the invention in a stretched inode.

FIG. 4 shows an illustration of how this invention can be made but does not mean the only way to make it. In this illustration the whole sunlight reflecting area consists of planar elements 9, 4, 5, 6 and attaching points 7, 8 is made of one piece of soft and flexible sheet. Then this sheet is folded and divided into different folds 9, 4, 5, 6 and attaching points 7, 8. Top cover 2, shown transparent in this illustration drawing, is made of sunlight absorbing material and color and is attached to the top fold of sheet as a cover when the shade is folded. In order to help this soft sheet to fold back to a compressed mode, four collapsible ribs 21, 22, 23, 24 are bounded to a shade surface at space-apart locations and are parallel to an vertical edge of the shade. These collapsible ribs work as folding guides. They are made of less flexible material, such as a pre-folded card-quality paper, so that they are flexible along the folding joints but not at other direction. Their folding joints are aligned together to shade sheet's folding seams to help sheet folds along the seams. A rigid beam 26 connects together with all folding guides 21, 22, 23, 24 and hook-handle 3 for joint moment when dragged via handle 3.

Figure 5:
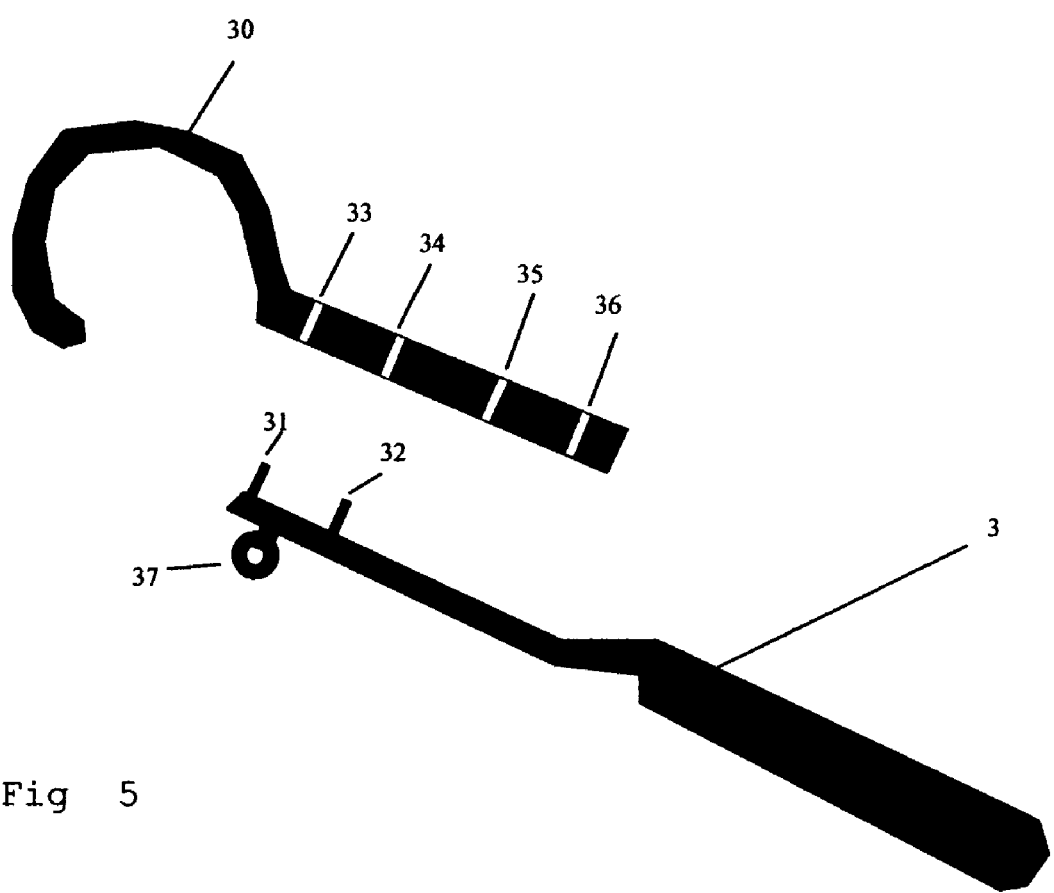
FIG. 5 is a perspective view of an adjustable hook and a handle according to the present invention.

FIG. 5 shows how hook-handle can adjust the length thereof for different applications. The hook-handle consists of two parts: a handle part 3 and a hook part 30. There are two binding pins 31, 32 on handle 3. And there are 2 sets of matching binding holes on the hook part 30 for these pins. If a shorter hook-handle is needed, holes 33, 34 are selected to accept binding pins 31, 32. Otherwise, if a longer hook-handle is needed, holes 35, 36 are selected to accept those binding pins 31, 32. A connector attaching point 37 on handle part 3 is for attaching to the connector beam 26.

We claim:

1. A windshield sunshade, comprising:
   (a) a sunshade having an extended configuration in which no part of shade overlaps with other parts and has a rectangular shape and a maximum size that matches a vehicle windshield for blocking sunlight to go through a windshield into vehicle interior, and a compressed configuration in which the shade folds horizontally into a plurality of folds in an overlapping manner for resting on top of a vehicle dashboard;
   (b) a plurality of attaching points on the bottom edge of the sunshade at spaced-apart locations for attaching to a top of dashboard;
   (c) a hook with an access handle attaching to a center of a top fold of the sunshade for gripping and pulling the sunshade out, and for hooking over a supporting point to hang the sunshade open; and
   wherein the sunshade includes a cover means attached to the top fold of the shade and covers the folded shade in the compressed configuration, and is made of a sunlight absorbing material and color for reducing gaze reflection.

2. A windshield sunshade, comprising:
   (a) a sunshade having an extended configuration in which no part of shade overlaps with other parts and has a rectangular shape and a maximum size that matches a vehicle windshield for blocking sunlight to go through a windshield into vehicle interior, and a compressed configuration in which the shade folds horizontally into a plurality of folds in an overlapping manner for resting on top of a vehicle dashboard;
   (b) a plurality of attaching points on the bottom edge of the sunshade at spaced-apart locations for attaching to a top of dashboard;
   (c) a hook with an access handle attaching to a center of a top fold of the sunshade for gripping and pulling the sunshade out, and for hooking over a supporting point to hang the sunshade open; and
   wherein the top fold of the shade has a V-shape cut from a top edge of the shade to a point that the hook-handle attaches to the shade so that a portion of the shade can go around the supporting point where the hook hangs and cover more windshield area higher than the supporting point is.

3. A windshield sunshade, comprising:
   (a) a sunshade having an extended configuration in which no part of shade overlaps with other parts and has a rectangular shape and a maximum size that matches a vehicle windshield for blocking sunlight to go through a windshield into vehicle interior, and a compressed configuration in which the shade folds horizontally into a plurality of folds in an overlapping manner for resting on top of a vehicle dashboard;
   (b) a plurality of attaching points on the bottom edge of the sunshade at spaced-apart locations for attaching to a top of dashboard;
   (c) a hook with an access handle attaching to a center of a top fold of the sunshade for gripping and pulling the sunshade out, and for hooking over a supporting point to hang the sunshade open; and
   wherein a fixed base on the top of the dashboard accepts the handle when the shade is in compressed mode.

4. The sunshade as recited in claim 1, wherein the shade has a sunlight reflective surface on a side facing the windshield as at an extended configuration.

5. The sunshade as recited in claim 2, wherein the shade has a sunlight reflective surface on a side facing the windshield as at an extended configuration.

6. The sunshade as recited in claim 3, wherein the shade has a sunlight reflective surface on a side facing the windshield as at an extended configuration.

7. The sunshade as recited in claim 1, wherein a hook to handle length is adjustable.

8. The sunshade as recited in claim 2, wherein a hook to handle length is adjustable.

9. The sunshade as recited in claim 3, wherein a hook to handle length is adjustable.

10. The sunshade as recited in claim 1, wherein the shade further comprising:
    (a) a sunlight blocking sheet made of soft flexible material that can be folded along horizontal folding seams into the compressed configuration or extracted out as an extended mode;
    (b) a plurality of collapsible ribs that are parallel to a vertical edge of the shade, each having flexible joints that align with folding seams of the shade, the ribs being otherwise rigid and attached to sheet's surface to hold the shape of the sheet;

(c) a connector at a level of the hook-handle couples all the ribs with the handle for joint movement between the compressed configuration and the extended configuration.

11. The sunshade as recited in claim 2, wherein the shade further comprising:
  (a) a sunlight blocking sheet made of soft flexible material that can be folded along horizontal folding seams into the compressed configuration or extracted out as an extended mode;
  (b) a plurality of collapsible ribs that are parallel to a vertical edge of the shade, each having flexible joints that align with folding seams of the shade, the ribs being otherwise rigid and attached to sheet's surface to hold the shape of the sheet;
  (c) a connector at a level of the hook-handle couples all the ribs with the handle for joint movement between the compressed configuration and the extended configuration.

12. The sunshade as recited in claim 3, wherein the shade further comprising:
  (a) a sunlight blocking sheet made of soft flexible material that can be folded along horizontal folding seams into the compressed configuration or extracted out as an extended mode;
  (b) a plurality of collapsible ribs that are parallel to a vertical edge of the shade, each having flexible joints that align with folding seams of the shade, the ribs being otherwise rigid and attached to sheet's surface to hold the shape of the sheet;
  (c) a connector at a level of the hook-handle couples all the ribs with the handle for joint movement between the compressed configuration and the extended configuration.

\* \* \* \* \*